Patented Sept. 23, 1952

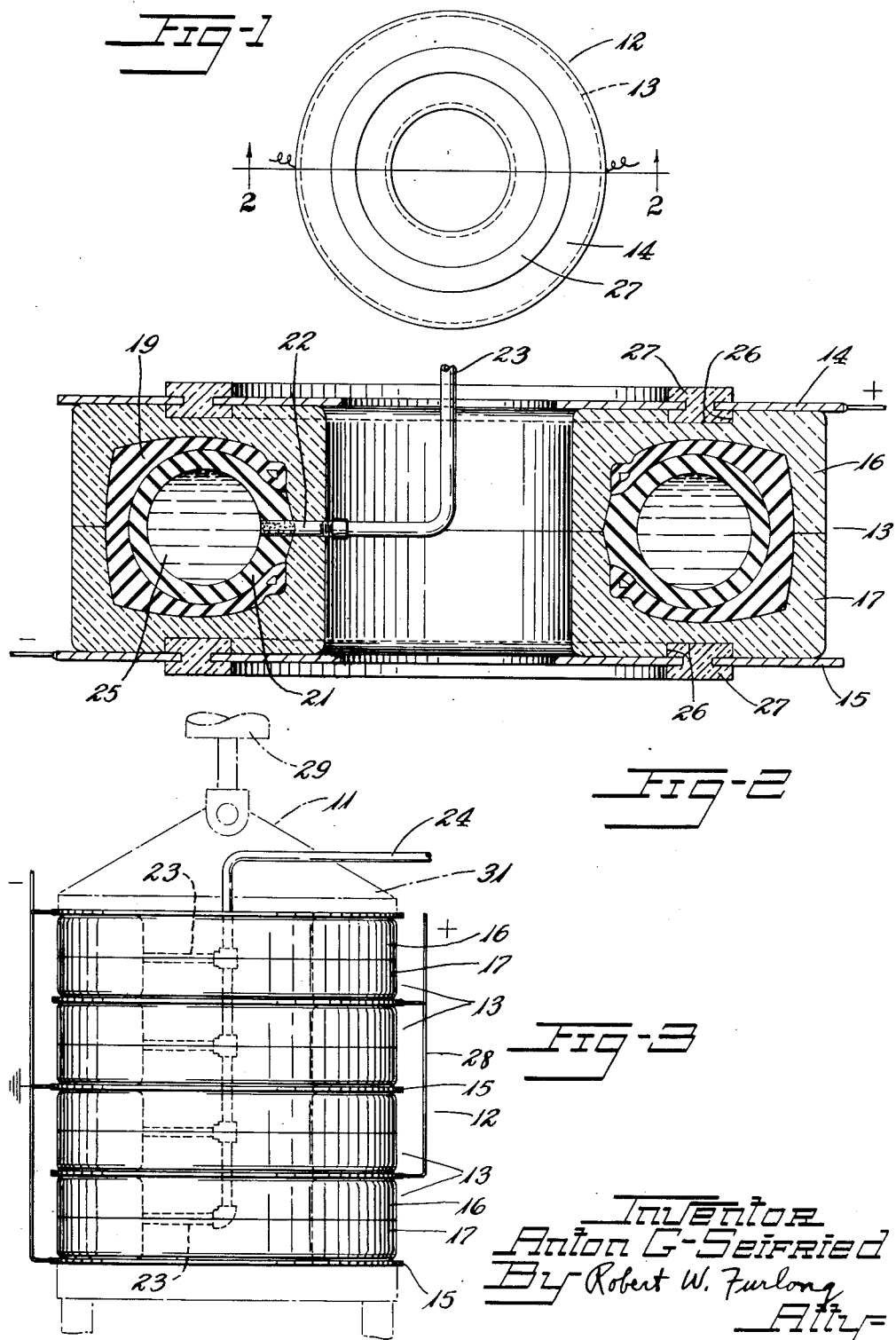
Sept. 23, 1952     A. G. SEIFRIED     2,611,152
VULCANIZATION OF TIRES WITH HIGH-FREQUENCY
FIELDS AND APPARATUS THEREFOR
Filed Dec. 1, 1951
Inventor
Anton G. Seifried
By Robert W. Furlong
Atty.

2,611,152

UNITED STATES PATENT OFFICE 2,611,152

VULCANIZATION OF TIRES WITH HIGH-FREQUENCY FIELDS AND APPARATUS THEREFOR

Anton G. Seifried, Akron, Ohio, assignor to The B. F. Goodrich Company, New York, N. Y., a corporation of New York Application December 1, 1951, Serial No. 259,397

9 Claims. (Cl. 18—38)

This invention relates to heating dielectric materials to vulcanization temperatures and especially to methods and apparatus for vulcanizing pneumatic tires by means of a high-frequency alternating electrostatic field.

It is an object of this invention to provide a method and apparatus for high-frequency curing of dielectric material such as tire casings.

It is an object to provide a suitable mold for vulcanizing tire casings in a high frequency alternating electrostatic field.

It is also an object to reduce the heating time necessary to vulcanize a tire casing.

It is a further object to provide a method of uniformly heating a tire casing to effect vulcanization.

It is an object to provide pressure means for forcing the tire casing outwardly against the mold while the tire casing is being vulcanized by a high frequency alternating electrostatic field.

Other objects will be apparent from the description and drawing.

These objects are attained by providing a two part mold of a dielectric material, a bag within the cavity of the mold which may be inflated, and electrodes which are arranged about the mold.

The invention can best be described by reference to the drawings, in which,

Fig. 1 is a plan view of a mold and electrode assembly;

Fig. 2 is a cross-sectional view along line 2—2 of Fig. 1 and shows the mold halves, electrodes, tire casing, and pressure bag within the tire casing; and Fig. 3 is a side elevation of a press, in which is a stack of mold asemblies in position for vulcanizing tires.

The apparatus comprises a press 11 adapted for accommodating a stack of one or more mold assemblies 12 which in turn comprise a single-cavity mold 13 of a dielectric material such as glass in the form of Fiberglas with a resinous binder, a positive electrode 14, and a negative electrode 15. The mold 13 is an annular one which is split into upper half 16 and lower half 17 enclosing a tire casing 19 with a rubber bag 21 therein. The rubber bag 21 is provided with a port 22 which is connected to a manifold 23 which in turn is connected with a pressure line 24 filled with a suitable fluid such as liquid polymeric silicone 25. Manifold 23 passes through the center opening formed by stacking annular molds and electrodes.

Each mold half is provided with an annular groove 26 which registers, when the proper alignment is achieved, with the annular member 27 of dielectric material secured to the flat, copper plate electrodes 14, 15.

As shown in Fig. 3 the molds 13, 13 may be stacked one on another. When this is done, a single positive electrode 14 is shared by adjoining molds, such as the lower two molds in the stack. Likewise, a single negative electrode 15 is shared by the second and third molds from the bottom of the stack, see Fig. 3. All the positive electrodes are connected to a bus bar 28 which in turn is connected to a source of high frequency power. The negative electrodes are connected to a common ground as shown.

The press is provided with hydraulic cylinder 29 which is adapted to raise and lower upper platen 31.

In using the apparatus of this invention, a mold 13 is loaded with an unvulcanized tire casing 19 which has been built in the conventional manner, and within which has been placed rubber bag 21 which is very similar to the water bags used with conventional vulcanization methods. The rubber composition used in making the bags is one which withstands the temperatures to which it is subjected during vulcanization of the tire casing. Any conventional water-bag composition may be used. After the mold halves 16 and 17 are closed about the tire casing a negative electrode and a positive electrode are placed next to the mold as shown in Fig. 2. This assembly 12 is then placed in a press or in some other manner clamped to secure the electrodes in a position immediately adjacent the mold.

A liquid dielectric material such as a liquid polymeric silicone is then forced under pressure through port 22 into rubber bag 21. The bag inflates and tends to force the unvulcanized tire casing outwardly against the walls of the mold cavity. While this bag is inflated, a high frequency alternating electrostatic field is generated between electrodes 14 and 15 by means of an oscillator or other suitable means not shown in the drawing. The tire casing is heated uniformly throughout its extent and is forced outwardly into the mold crevices by the pressure afforded by the expanded bag 21. The liquid silicone, which has similar dielectric properties to those of rubber and Fiberglas provides a path for the electrical current which permits a field of uniform strength to exist between the electrodes at all points. Fluids such as air or steam which may have dielectric properties different from that of rubber would cause the field strength through the central portions of the cavity to be quite low.

The metal and cloth parts of the tire casing are not heated sufficiently to damage them. After the tire casings are vulcanized the mold is opened and the tires removed.

Instead of using a single mold assembly 12, a plurality of assemblies may be stacked in a press as shown in Fig. 3 with the ports 22, 22 connected together by means of manifold 23. With arrangement of the electrodes as shown, i. e., every other electrode in the stack being positive, a field may be set up within each mold to effect vulcanization of the tire casings therein.

After heating for a sufficient time, the field is destroyed and the molds are opened for removal of the vulcanized tire casings. After the molds are cleaned, they may be reloaded and another cycle completed.

The liquid polymeric silicones which can be employed to inflate rubber bag 21 are well known materials generally prepared by the hydrolysis and subsequent polymerization of an organo-silicon halide or mixtures of two or more such halides. The liquid polymeric silicones can be prepared from a parent halide having two alkyl, alicyclic, aralkyl or two aryl radicals or one of each of these radicals attached to the silicon atom and thus contain the unit structure

where each of $R_1$ and $R_2$ are one of the above radicals. However, the usual liquid polymeric silicones are prepared from a mixture of silicon halides having one, two or three R groups attached to the silicon atom. Such liquid polymeric silicons will contain not only the above unit structure but also the structure

where the parent halide has only one R group and the unit structure of

when the parent halide has three R groups. For the purposes of this invention there can be employed the liquid polymeric silicones resulting from the hydrolysis and polymerization of organo-silicone halides having two R groups on the silicon atom as well as those prepared from mixtures of organo-silicone halides having one, two or three R groups on the silicon atom.

The liquid polymeric silicones should of course remain liquid throughout the vulcanization heating and for most satisfactory use remain as a liquid and never solidify by further polymerization. Thus the liquid polymeric silicones which will accomplish the objects of this invention are those which are stable at temperatures from 75° to 500° F. However other liquid polymeric silicones can also be employed by stabilizing them according to methods well known to the art such as by adding to the silicone an arylamine, a hydroxy arylamine or a mono- or poly-hydroxy aromatic compound to prevent further polymerization of the liquid silicone to a solid or resinous state.

The most preferred liquid polymeric silicones are further characterized by their dielectric property or power factor which should be substantially equal to that of the unvulcanized rubber composition such as a tire casing.

Specific liquid polymeric silicones include among others those prepared from silicon halides containing as the R groups such radicals as the methyl; ethyl; propyl; ispropyl; butyl; amyl; hexyl; heptyl; octyl; cyclopentyl; cyclohexyl; phenyl; tolyl; xylyl; mesityl; mono-, di-, and tri-ethyl phenyl; naphthyl; methylnaphthyls, ethylnaphthyls; tetrahydronaphthyl; and anthracyl; benzyl; and phenethyl among others. Such specific liquid polymeric silicones as trimeric phenyl ethyl silicone, bis-phenyldimethyl silicyl oxide, diethyl silicone, as well as liquid copolymers having the following formulae:

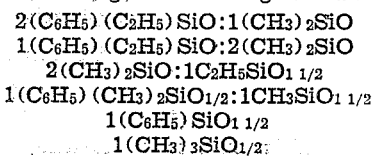

and $1(C_6H_5)(C_2H_5)SiO:1(C_2H_5)_2SiO$ are examples of liquid polymeric silicones useful as a liquid dielectric according to this invention.

The electrodes may be of any suitable metal, such as aluminum or copper or other conductive metal. The material used in the mold may be any suitable dielectric material including glass, porcelain and others.

The apparatus and methods of this invention make it possible to utilize all the advantages of heating by a high frequency field in the vulcanization of tire casings. The tire casing is heated uniformly throughout its extent so that no overcure or scorching of certain parts of the carcass or tread or bead portions takes place while other portions remain undercured or partially vulcanized. Furthermore, savings in time, mold costs, and labor are gained.

Obvious variations and modifications may be effected within the spirit and scope of the invention as defined in the appended claims.

I claim:

1. Apparatus for vulcanizing hollow rubber articles comprising a pair of opposed, spaced electrodes, means for establishing a high-frequency alternating electrostatic field between said electrodes, mold means of a dielectric material arranged between said electrodes, said mold means having a cavity to accommodate an unvulcanized hollow rubber article and an expansible bag therein containing a fluid dielectric material, said fluid dielectric material having a power factor substantially equal to that of the unvulcanized rubber article, and means for urging said electrodes one toward the other to secure said mold means therebetween.

2. Apparatus for forming and vulcanizing hollow rubber articles comprising a pair of opposed spaced electrodes, means for establishing a high frequency alternating electrostatic field between said electrodes, a split mold comprising a dielectric material disposed between said electrodes, said mold having a cavity to accommodate an unformed unvulcanized rubber article and an expansible bag therein containing a fluid dielectric material for forcing the unformed rubber article outwardly against the cavity wall, said fluid dielectric material being a liquid polymeric silicone having a power factor substantially equal to that of the unvulcanized rubber article; and a means for urging said electrodes one toward the other to secure said mold means therebetween.

3. Apparatus for vulcanizing a pneumatic tire comprising a pair of opposed spaced electrodes, a split mold having a cavity to accommodate an unvulcanized tire and suitable for forming a tire arranged between said electrodes, said mold comprising a dielectric material, an expansible bag containing a fluid dielectric material, said bag being positioned in said cavity to substantially fill said cavity when inflated and thereby forcing the tire outwardly against the cavity wall, said fluid dielectric material being a liquid polymeric silicone having a power factor substantially equal to that of the unvulcanized rubber tire, a means for urging said electrodes one toward another to secure said mold therebetween, and a means for establishing a high-frequency alternating electrostatic field between said electrodes.

4. Apparatus for vulcanizing a pneumatic tire comprising a pair of opposed spaced electrodes, a split mold of dielectric material having a cavity to accommodate an unvulcanized tire and suitable for forming a tire arranged between said electrodes, said mold comprising glass fibers with a resinous binder, an expansible bag containing a fluid dielectric material, said bag being positioned in said cavity to substantially fill said cavity when inflated and thereby forcing the tire outwardly against the cavity wall, said fluid dielectric material being a liquid polymeric silicone having a power factor substantially equal to that of the unvulcanized tire, a means for urging said electrodes one toward another to secure said mold means therebetween, and a means for establishing a high-frequency alternating electrostatic field between said electrodes.

5. Apparatus for vulcanizing tire casings comprising a press and a plurality of annular molds adapted to be stacked with electrodes one on top of the other with electrodes interposed between each mold within said press to obtain an electrode, a mold and an electrode in alternate succession; means for coupling said electrodes so that each mold is between a pair of opposed electrodes; said molds being of a dielectric material each having a cavity to accommodate an unvulcanized tire casing provided with an expansible bag which substantially fills the cavity when inflated forcing said tire casing outwardly against the cavity wall; said bag containing a fluid dielectric material; said fluid dielectric material being a liquid polymeric silicone having a power factor substantially equal to that of the rubber composition in said tire casing; means for urging said electrodes and molds one toward another to secure said molds between said electrodes; and a means for establishing a high-frequency alternating electrostatic field between said electrodes.

6. A method of molding and vulcanizing a tire casing comprising confining an unvulcanized tire casing within a cavity of a mold of dielectric material, forcing said tire casing outwardly against the walls of said cavity through the force exerted by a liquid polymeric silicone and subjecting said tire casing to a high-frequency alternating electrostatic field between opposed electrodes to heat and vulcanize the same.

7. A method of molding and vulcanizing a tire casing comprising inserting an expansible bag in an unvulcanized tire casing, confining said tire casing and bag in a cavity in a mold comprising glass fibers and a resinous binder, inflating said expansible bag with a liquid polymeric silicone to force said tire casing outwardly against the walls of said cavity, and subjecting said tire casing to a high-frequency electrostatic field between opposed electrodes to heat and vulcanize the same.

8. In the molding and vulcanizing of a tire casing by heating a tire casing in a dielectric mold by a high-frequency electrostatic field between opposed electrodes the step which comprises forcing the tire casing against the walls of the mold cavity by inflating an expansible bag within the tire casing with a liquid polymeric silicone, and then heating said tire casing with the high-frequency electrostatic field to heat and vulcanize the same.

9. A method of molding and vulcanizing a tire casing comprising inserting an expansible bag in an unvulcanized tire casing, confining said tire casing and bag in a cavity in a mold comprising glass fibers and a resinous binder, inflating said expansible bag with a liquid polymeric silicone having a power factor substantially equal to that of the unvulcanized tire casing to force said tire outwardly against the walls of said cavity and subjecting said tire casing to a high-frequency electrostatic field between opposed electrodes to heat and vulcanize the same.

ANTON G. SEIFRIED.

REFERENCES CITED

The following references are of record in the file of this patent:

UNITED STATES PATENTS

| Number | Name | Date |
|---|---|---|
| 2,421,097 | Lakso | May 27, 1947 |
| 2,421,099 | Vogt | May 27, 1947 |
| 2,441,548 | Sperry | May 11, 1948 |

OTHER REFERENCES

Modern Plastics, pp. 142–145, July 1946.